United States Patent [19]
Schenkler

[11] Patent Number: 6,078,902
[45] Date of Patent: Jun. 20, 2000

[54] SYSTEM FOR TRANSACTION OVER COMMUNICATION NETWORK

[75] Inventor: Leon Schenkler, Tel-Aviv, Israel

[73] Assignee: Nush-Marketing Management & Consultance, Tel Aviv, Israel

[21] Appl. No.: 09/059,180

[22] Filed: Apr. 14, 1998

[30] Foreign Application Priority Data

Apr. 15, 1997 [IL] Israel ......................................... 120672

[51] Int. Cl.⁷ .................................................. G06F 17/60
[52] U.S. Cl. .............................. 705/35; 235/380; 380/24; 380/30; 705/12; 705/44; 705/39; 705/41
[58] Field of Search .................... 235/380, 487, 235/488, 386; 380/24, 30, 25; 705/12, 44, 41, 39, 10, 26, 27, 28

[56] References Cited

U.S. PATENT DOCUMENTS

| | | | |
|---|---|---|---|
| 4,977,595 | 12/1990 | Ohta et al. | 380/24 |
| 5,455,407 | 10/1995 | Rosen | 235/380 |
| 5,913,203 | 6/1999 | Wong et al. | 705/39 |

FOREIGN PATENT DOCUMENTS

9708665  8/1995  WIPO ............................... G07F 7/08

OTHER PUBLICATIONS

Jinn–Ke Jan et al, A Secure voting protocol with IC Cards, Institute of Applied Math, pp. 259–260, Jan. 1995.
Navigator, Cookies and Privacy FAQ, pp. 1–3, Mar. 1996.
Klur, David, what an organization should know about using electronic, Information Strategy, pp. 1–3, Mar. 1997.
Jiawen Su and Daniel Manchala, Building Trust for Distributed Commerce Transactions, pp. 322–323, Jan. 1997.
S. Evan, et al, Electronic wallet, Digital Communication, p. 199, Jan. 1984.
Ravi Kalakota et al, Electronic commerce, pp. 59, 96, 126, 194, Dec. 1996.
Abstract of U.S. Patent 5,221,838, published Jun. 22, 1993.
Abstract of U.S. Patent 4,877,950, published Oct. 31, 1989.
Abstract of U.S. Patent 5,511,121, published Apr. 23, 1996.
Abstract of U.S. Patent 5,455,407, published Oct. 3, 1995.
Abstract of U.S. Patent 4,405,829, published Sep. 20, 1983.
Internet Document, "Cookies and privacy FAQ", http://search.netscape.com/assist/security/faqs/cookies.html#what_are, copyright 1998.
Internet Document, "The SSL protocol.", http://search.netscape.com/newsref/std/SSL.html, copyright 1998.
Internet Document, "SET Secure Electronic Transaction at Visa.", http://www.visa.com/cgi–bin/vee/nt/ecomm/set/main.html?2+0, copyright 1996–86.
Internet Document, "Secure Enterprise Connectivity", http://www.checkpoint.com/products/firewall–1/descriptions/products.html, copyright 1998.

*Primary Examiner*—James P. Trammell
*Assistant Examiner*—Mussie K. Tesfamariam
*Attorney, Agent, or Firm*—Browdy and Neimark

[57] ABSTRACT

A method for conducting transaction between first user and a remote second user interlinked through a communication network, by utilizing also a clearing office interlinked to the network. The clearing office storing the user privileged information. The method including the steps of the user and the clearing office establishing a cryptographic secured session, the user transmitting, via the session, a user privileged information and transaction specific data, the transaction specific data being indicative of a transaction identification data. The clearing office activating transaction validity checking procedure by utilizing a user privileged information and the transaction specific data. In response to affirmative result of the transaction validity checking, the clearing office producing a transaction validity indication being indicative of the transaction identification code. The clearing office and the user establishing a communication session and the clearing office transmitting, via the session, the transaction validity indication.

22 Claims, 5 Drawing Sheets

SYSTEM FOR TRANSACTION OVER COMMUNICATION NETWORK

FIELD OF THE INVENTION

The present invention is in the general field of securing user privileged information when transacting e.g. acquiring product from vendor over public communication network, such as the Internet.

Product, in the context of the invention includes also service such as video upon demand, provision of information, etc. Communication network in the context of the invention is not limited to a specific network and encompasses e.g. LAN, WAN and combination thereof, as well as wireless communication networks.

BACKGROUND OF THE INVENTION

With the ever increasing popularity of communication networks such as the Internet, new applications have been introduced, including the so called "electronic commerce". In an exemplary electronic commerce application, e.g. over the Internet, a customer (referred to also as "user", or "first user") transact over the Internet by accessing a vendor's (referred to also as "server" or "second user") site, normally by establishing communication between the customer's client station, typically a P.C., and the vendor's remote server.

Having logged into the desired server site, the customer can select a desired product for purchase. After having paid, on-line, for the desired product or service, the latter is supplied on-line e.g. downloaded, over the network, to the consumer's P.C. or off-line, e.g. by a regular mail service.

The on-line payment over the network poses serious security problems. For accomplishing payment, user privileged information should be provided. By this example, user privileged information includes the customer's credit card number or the identifying code of his/her electronic wallet, or electronic money. (Detailed description of electronic wallet techniques is disclosed, e.g. in U.S. Pat. No. 5,511,121, Efficient Electronic Money; U.S. Pat. No. 5,221,838, Electronic Wallet; and U.S. Pat. No. 4,877,950, Electronic Purse-Device; detailed discussion in electronic money can be found in e.g. U.S. Pat. No. 5,511,121 "Efficient electronic money", U.S. Pat. No. 5,455,407 "Electronic monetary system"). Transaction over the network is, normally, associated also with transaction specific information, and in the latter example, it includes the cost that should be billed for this particular product. The billing may be effected e.g. by crediting loan account or by debiting deposit account.

Thus, if the on-line payment is made by means of a credit card, the communication protocol should assure that the credit card number (constituting user privileged information) that is transmitted over the network is not susceptible to cracking by proficient eavesdropper.

One possible approach of coping with these difficulties is the introduction of the so-called secure electronic transaction (SET) protocol which has been introduced by leading credit card companies (Visa and MasterCard), as well as leading computer companies (Microsoft, IBM and others) that have been consolidated to this end.

Attention is now directed to FIG. 1, illustrating a simplified schematic block diagram of communication protocol, that utilizes the SET standard, between user and vendor.

Thus, for the purpose of on-line payment, the user 1 accesses the vendor 2 over communication network, indicated, generally, by arrow 5, by means of message or messages that include(s) encrypted data indicative of the credit card number (user privileged information) and the amount (transaction specific information) that he/she commits to pay for the specified service or product. The data, in this particular example, is encrypted by means of the SET protocol such that the contents thereof is rendered practically undecipherable for any unauthorized party. In this context the vendor is regarded, of course, as an unauthorized party. The rational behind this approach is to eliminate the possibility of forging, or in other words, to prevent the possibility that the vendor (or any other unauthorized party) will decipher the user privileged information, (i.e. reveal the credit card number) and will use it without obtaining permission from the user.

Turning again to FIG. 1, the vendor forwards the encrypted data to clearing offices 3 and 4 which are regarded as trusted parties. The latter are capable of deciphering the encrypted message (i.e. they hold the appropriate deciphering key(s)), and after ascertaining the user's ID and credit, they affirm (or reject) the transaction and inform on the same to the vendor. Of course, in case of affirmation the user's balance is duly updated. It is absolutely necessary that the trusted party will be temper-proof in order to substantially eliminate any possibility of obtaining the deciphering key(s) and/or any other privileged information held by the clearing office by a third, unauthorized party.

The advantage of using the SET protocol, or the like, is that the credit card number and possibly other user privileged information are retained concealed as the clearing office.

The utilization of the SET protocol and equivalent solutions offer, thus, some kind of security for users who commit electronic commercial transactions over communication networks.

The latter solutions have, however, inherent shortcomings in that unauthorized parties (in this particular case the vendor) hold privileged information of user (albeit in encrypted form). By this particular example the privileged information includes the user's credit card number in an encrypted form. Since there is not available, commercially, a perfect encryption system, there always exists the risk that the distrusted party (by this particular example, the vendor) will manage to decipher encrypted message and extract therefrom the user privileged information or portion thereof and use it improperly.

The above description focused on committing business transaction in the form of acquiring a product or service from remote vendor over communication network. However, the problem of rendering user privileged information susceptible to cracking when transmitted over communication network is shared by many other applications. Typical yet not exclusive examples being user identification system, electronic election system and many others.

It is accordingly the object of the present invention to provide for a system for transacting between user and remote distrusted party over communication network whilst rendering the user privileged information unaccessible to the distrusted party.

GENERAL DESCRIPTION OF THE INVENTION

According to the proposed technique of the invention any form of user privileged information (either explicit or encrypted), that is necessary in order to conduct the commercial or non commercial transaction is not accessible to the distrusted party.

There follows a description of a typical, yet not exclusive, operation of a technique of the invention for the specific application of a first user acquiring a product from remote vendor i.e. a second user (being distrusted party) over the Internet.

At the onset, the user and the vendor establish a communication session e.g. over the Internet. The user sends via the session an enquiry in order to ascertain the costs C (forming part of the transaction specific information) of a desired given (at least one) product. The enquiry normally includes information required to identify the requested product(s) and the amount thereof.

The vendor replies, via said session, by providing the requested cost data and possibly also the vendor identification.

Of course, if the user is a priori aware of the specified costs of the desired products, the necessity for establishing the specified session is obviated.

Having received the cost data, the user establishes a cryptographic secured session with a trusted party (i.e. a clearing office). The user sends via the cryptographic secured session, all the relevant data that is required for the clearing office in order to approve the transaction. Accordingly, the relevant data includes user privileged information such as the user's credit card number (or electronic wallet ID and password). The relevant data included also transaction specific data for this particular commercial transaction, i.e. the specified cost data. Preferably the particulars of the vendor, i.e. vendor identification, are also transmitted to the clearing office.

A cryptographic secured session may be established over a private secured line, which is not accessible to eavesdroppers. In the case of public lines, as is normally the case in the Internet, a suitable, known per se, encryption algorithm should be applied to the transmitted messages in order to accomplish the specified cryptographic secured session.

Techniques for accomplishing cryptographic secured sessions are e.g. the known Data Encryption Standard (DES) and the RSA algorithm. For detailed discussion of the DES standard, see "DATA Encryption Standard, Federal Information Processing Standards", Publication 46, Jan. 15, 1977; the RSA algorithm is described in U.S. Pat. No. 4,405,829.

In the context of the invention, cryptographic secured session should have at least the following characteristics, (i) it is safe against eavesdropping; in other word the contents of a message even if intercepted is rendered essentially undecipherable to the unauthorized eavesdropper; (ii) it provides high degree of authentication to either or both of the receiver and the sender; and (iii) it essentially maintains data integrity in the sense that any unauthorized change of the original message transmitted via said session is detectable, all as known per se.

Example of such an algorithm is the known Secure Sockets Layer (SSL) which is applicable for surfing in the Internet e.g. by utilizing the Netscape browser (ver 2.0 and above), commercially available from Netscape Inc. Insofar as the SSL is concerned, provision (ii) is met since from among the user and the server, the latter is always authenticated.

Next, the clearing office conducts the transaction validity checking procedure in order to ascertain whether or not to affirm the transaction. Thus, for example, in the case of credit card, the checking procedure includes confirming that the user has sufficient credit, i.e. whether the user's credit $\geq C$ (where C stands for the cost of the transaction). In the case of electronic wallet, the specified procedure assures that the current credit of the wallet is $\geq C$.

In the case of affirmative results, the clearing office updates the database to reflect that the transaction (which involves updating the user's balance) has been validated. The clearing office sends, via the cryptographic secured session, a transaction validity indication which validates the commercial transaction under consideration.

By one embodiment, the transaction validity indication may be realized as a safety code (SC) randomly (or otherwise) generated for identifying the specified transaction in the clearing office database. By another variation the SC may be encrypted to represent other information such as one or more of the following: the vendor ID (if transmitted by the user in the previous session between the user and the clearing office), transaction time, the approved amount, and others, all as required and appropriate. For convenience, the transaction validity indication sent from the clearing office may include, apart from the SC, also the approved amount. Note that the transaction validity indication does not include user privilege information such as the credit card number and/or the electronic wallet ID and password.

Having received the SC (which attests that the clearing office has affirmed the transaction), the user establishes a communication session with the vendor and provides him the specified SC.

Next, the vendor establishes a cryptographic secured session with the clearing office, and transmits via the session the SC.

The clearing office checks the validity of the SC (e.g. checks that the SC, that was transmitted from the vendor, exists in the clearing office's database) and credits the vendor by the amount C and sends, via said session, an acknowledgement to the vendor which signifies that he can deliver the specified product(s) or services.

The latter exemplary sequence of operations may be subject to various modifications, depending upon the application. There follows a reference to some non limiting modifications:

The user privileged information may vary depending upon the specific application. Thus, by way of non limiting example, in the case of credit card based payment system, the user privileged information includes e.g. credit card number; in the case of electronic wallet based payment system, the user privileged information includes, e.g. electronic wallet identification code and password; whereas the payment system, specified above, utilizes credit card and or electronic wallet, other payment means are, of course, feasible, e.g. electronic money. In the latter case, electronic wallet ID and password, that were utilized in the case of electronic wallet, may be replaced by e.g. electronic money code. In the case of remote election system, the user privileged information includes, e.g. user identification number. It should be noted that given user privilege information is not necessarily of permanent nature (as is the case, e.g. of person identity number) but rather, it may be changed from time to time. Thus, for example, in a given application, user privilege information of a given user should be changed in each separate transaction.

By the same token, the transaction validity indication may vary depending upon the specific application.

Some of the specified steps may be deleted or amended and others may be added; thus, for example, the initial communication session between the user and the vendor may be obviated, if the user is a priori aware of the desired product costs. By another example, the step of sending SC from the clearing office to the user who, in turn, sends the SC to the vendors who, in his turn, sends it to the clearing office, may be obviated and accordingly the clearing office, after applying the transaction validity checking procedure, may debit the user account, credit the vendor account and acknowledge the vendor (and possibly also the user) that the transaction has been completed. Such acknowledgement may simply indicate that the transaction has been successfully completed, or if desired, may be indicative of data such as the approved costs and others. As will be explained below, the specified acknowledgement may be indicative of actual money, e.g. "Internet money" transferred in a cryptographic secured session from the clearing office to the second user.

Of course, whenever required, other data may also be transmitted in the communication sessions. Thus, by way of non limiting example, during the initial communication session between the user and the vendor user data such as user address and age may be transmitted provided, of course, that they do not constitute privileged information. By way of another non limiting example, in the case of electric money, the clearing office may return to the first user, along with the SC, also user privilege information indicative of a "change". Consider, for example, a transaction that amounts for US 80$. If the user "pays" electronic money that amounts for US 100$, than the clearing office will not only return SC, but also user privilege information that is indicative of US 20$, for future use.

Depending upon the desired level of security, communication sessions (e.g. between the user and the vendor) may be encrypted with respect to all or part of the information transmitted via said session.

The transaction validity checking procedure may vary depending upon the specific application. Thus, by way of non limiting example in the case of electronic wallet payment system, before checking the electronic wallet credit, the validity of the wallet is examined, e.g. whether the identification code and password are valid.

Accordingly, the invention provides for, a method for conducting transaction between first user and a remote second user interlinked through a communication network, by utilizing also a clearing office interlinked to said network, the clearing office storing at least said user privileged information comprising:

(a) the user and the clearing office establishing a cryptographic secured session, the user transmitting, via said session, at least user privileged information and transaction specific data, the transaction specific data being indicative of at least transaction identification data;

(b) the clearing office activating transaction validity checking procedure by utilizing at least (i) said user privileged information or portion thereof; and (ii) said transaction specific data or portion thereof;

(c) in response to affirmative result of said transaction validity checking, the clearing office producing at least a transaction validity indication being indicative of at least said transaction identification code and not of said first user privileged information; the clearing office and said second user establishing a communication session and the clearing office transmitting, via said session, at least said transaction validity indication, whereby the first user privileged information is not accessible to the second user.

The present invention further provides for a method for conducting transaction between first user and a remote second user interlinked through a communication network, the clearing office storing at least said user privileged information by utilizing also a clearing office interlinked to said network, comprising:

(a) the user and the clearing office establishing a cryptographic secured session, the user transmitting, via said session, at least user privileged information;

(b) the clearing office activating transaction validity checking procedure by utilizing at least said user privileged information or portion thereof;

(c) in response to affirmative result of said transaction validity checking, the clearing office producing at least a transaction validity indication that is not being indicative of said first user privileged information; the clearing office and said first user establishing a communication session and the clearing office transmitting, via said session, at least said transaction validity indication;

(d) the first user receiving, via said session, the transaction validity indication; the first user and the second user establishing a communication session and the first user transmitting, via said session, at least said transaction validity indication;

(e) the second user and the clearing office establishing cryptographic secured session and the second user transmitting, via said session, at least said transaction validity indication;

(f) the clearing office applying a second checking procedure, and in case of affirmative result sending at least an acknowledgment to the second user, whereby the first user privileged information is not accessible to the second user.

Still further, the invention provides for, a system for conducting transaction over communication network, comprising:

a clearing office system, first user system and a second user system all interlinked by means of said communication network;

said first user system and said clearing office system are capable of establishing cryptographic secured session, the user transmitting, via said session, at least user privileged information and transaction specific data, the transaction specific data being indicative of at least transaction identification data;

said clearing office system being capable of activating transaction validity checking procedure by utilizing at least (i) said user privileged information or portion thereof; and (ii) said transaction specific data or portion thereof;

in response to affirmative result of said transaction validity checking, the clearing office system is capable of producing at least a transaction validity indication being indicative of at least said transaction identification code and not of said first user privileged information;

the clearing office and said second user are capable of establishing a communication session and the clearing office transmitting, via said session, at least said transaction validity indication, whereby the first user privileged information is not accessible to the second user system.

The invention further provides for, a system for conducting transaction over communication network, comprising:

a clearing office system, first user system and a second user system all interlinked by means of said communication network;

the user system and the clearing office system are capable of establishing a cryptographic secured session, the user transmitting, via said session, at least user privileged information;

the clearing office system id capable of activating transaction validity checking procedure by utilizing at least said user privileged information or portion thereof;

in response to affirmative result of said transaction validity checking, the clearing office system id capable of producing at least a transaction validity indication that is not being indicative of said first user privileged information;

the clearing office system and said first user system are capable of establishing a communication session and the clearing office system is capable of transmitting, via said session, at least said transaction validity indication;

the first user system id capable of receiving, via said session, the transaction validity indication;

the first user system and the second user system are capable of establishing a communication session and the first user system is capable of transmitting, via said session, at least said transaction validity indication;

the second user system and the clearing office system are capable of establishing cryptographic secured session and the second user system is capable of transmitting, via said session, at least said transaction validity indication;

the clearing office is capable of applying a second checking procedure, and in case of affirmative result sending at least an acknowledgment to the second user system, whereby the first user privileged information is not accessible to the second user system.

BRIEF DESCRIPTION OF THE DRAWINGS

For a better understanding, the invention will now be described, by way of example only, with reference to the accompanying drawings, in which.

DESCRIPTION OF SPECIFIC EMBODIMENTS

Figure 1:
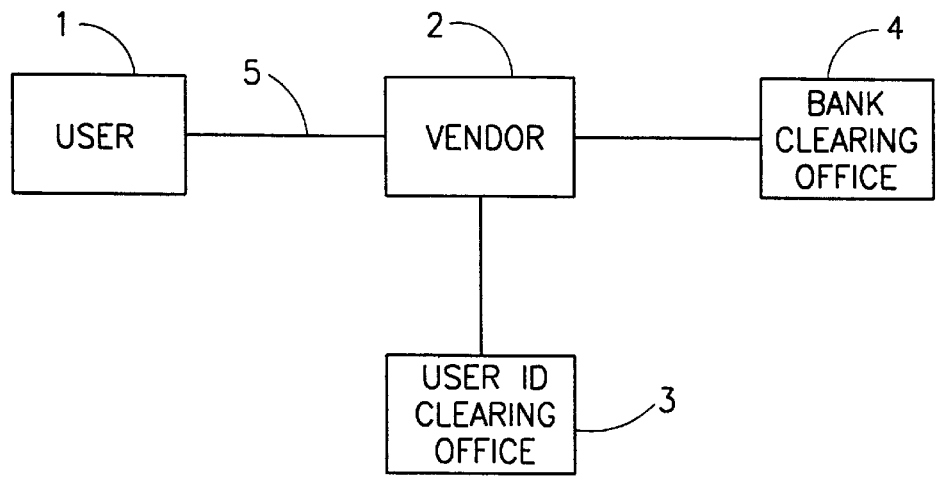
FIG. 1 is a simplified block diagram illustrating a payment system over public communication network, which utilizes the SET protocol.
Figure 2:
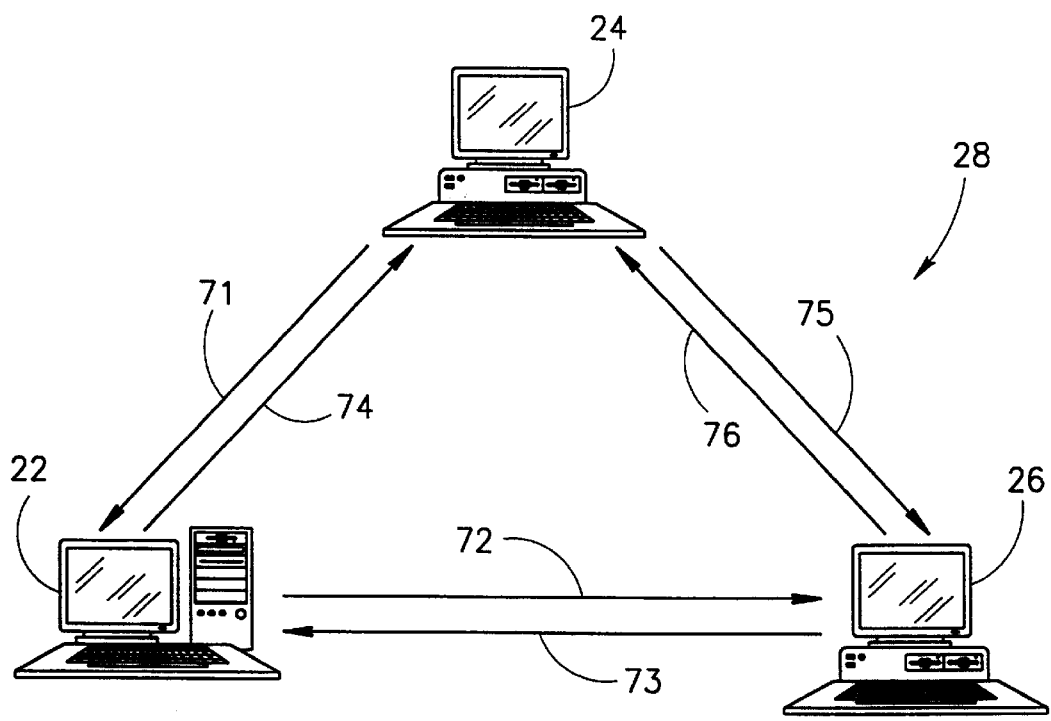
FIG. 2 is a schematic illustration of a payment system according to one embodiment of the invention.

Attention is first directed to FIG. 2, showing a user station (22), a vendor server (24), and a Clearing Office (26) all being, e.g Pentium® based P.C., commercially available from Intel Corp, and all interlinked by communication network, e.g. the Internet, designated generally, as (28). Whilst, for simplicity only one user station, one vendor station and one clearing office are illustrated in FIG. 2, those versed in the art will readily appreciate that user stations, vendor stations and clearing offices may be linked by communication network.

Figure 3:
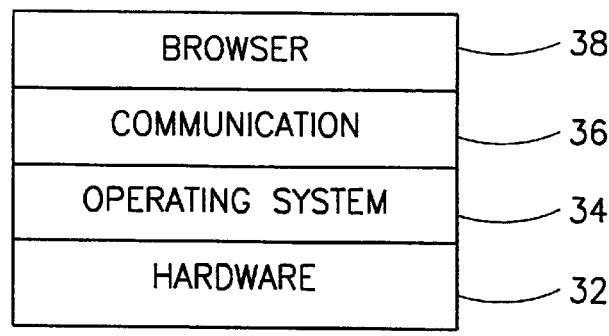
FIG. 3 is a block diagram of the various modules that constitute a "first user" in a payment system of FIG. 2, according to one embodiment of the invention.
Figure 4:
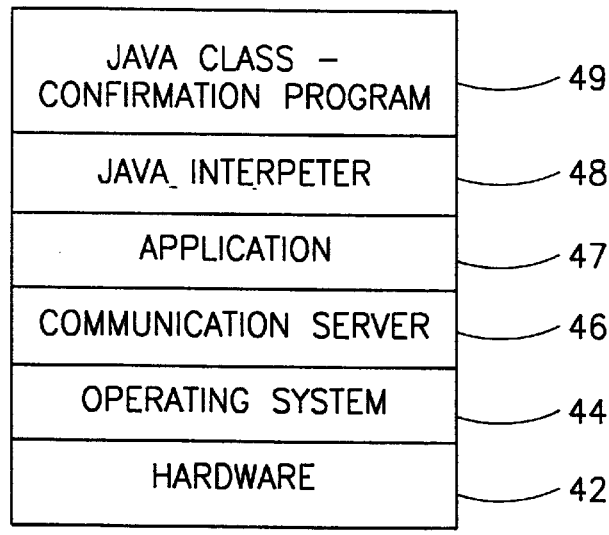
FIG. 4 is a block diagram of the various modules that constitute a second user (vendor) in a payment system of FIG. 2, according to one embodiment of the invention.
Figure 5:
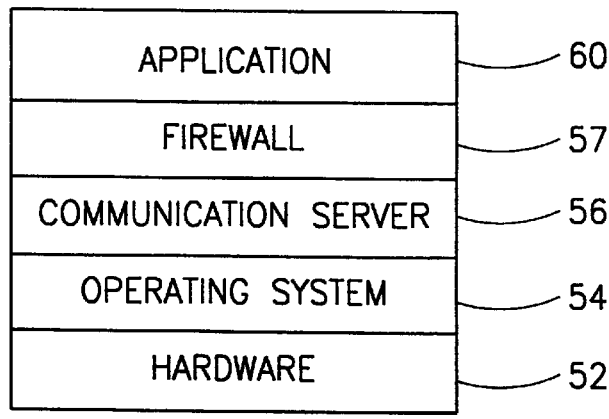
FIG. 5 is a block diagram of the various modules that constitute a clearing office in a payment system of FIG. 2, according to one embodiment of the invention.

In the description that follows reference is occasionally made also to FIGS. 3, 4 and 5. In the embodiment of FIG. 2 each P.C. is duly equipped with hardware modules, including sufficient internal and external memory volume, (designated as 32, 42, and 52, respectively). Each P.C. is loaded with known per se operating system e.g. Windows NT, commercially available from Microsoft Inc. (designated as 34, 44, and 54, respectively), and is further equipped with appropriate communication modules such as that software package that is responsible for communicating with the modem (designated as 36, 46, and 56, respectively).

The user privilege information may be stored in non volatile memory, e.g. in removable smart card, or in any other, known per se means.

The clearing office P.C. (26) is further equipped with e.g. firewall module (58) commercially available from Check Point, in order to enhance the security of the clearing office and reduce the likelihood of unauthorized admittance thereto. The latter along with electronic and other measures will render the clearing office trusted party.

The Browser module (38), e.g. Netscape ver. 3.0 commercially available from Netscape Inc., will serve to access the vendor site (24) as well as the clearing office station (26).

As will be explained in greater detail below, the application module (47) (realized by means of known per se HTML and/or VRML and/or CGI software tools), as well as the Java class confirmation program (49) (and its associated Java Interpreter (48)) serve for realizing the payment system of the invention, insofar as the vendor is concerned. By the same token, application module (60) serve for realizing the payment system of the invention, insofar as the clearing office is concerned.

The realization of user station (first user) vendor (second user) and clearing office as a conventional P.C. is, of course, only an example. Thus, by way of non limiting example, the clearing office may be realized as a distributed system, wherein various modules thereof are located in different platforms. Those versed in the art will readily appreciate that the respective PCs illustrated in FIG. 2 (or any other equivalent hardware realization) are each, not necessarily adapted for the use of sole user. Thus, many users (each constituting a "first user") may exploit the P.C. station (22), each utilizing of course a unique identification code (and unique user privileged information). Other variants are also applicable, all as required and appropriate.

It should be noted generally, that the various items that are fed during the various stages of the operation of the system, may be input by utilizing, e.g. known per se forms that are configured to input and output data in pre-configured fields.

The operation of a payment system according to one embodiment of the invention will now be described.

Albeit not shown in the drawings, in an initial setup phase, the user station (22) establishes communication with the clearing office (26).

As is well known in the Internet environment, a server (which by this particular embodiment stands for the clearing office (26)) can store private data at a remote user site (i.e. at the storage medium of the user station (22) thereof) by means of a so called "cookie" utility that forms integral part of conventional browser. After having registered the specified data, the "cookie" utility assures that only the specified server will be able to access that data when establishing communication with this particular user. In other words, any other remote station (or server) that will establish communication with this particular user station, will be prohibited from accessing the private data.

Accordingly, by this embodiment the clearing office (26) registers at the user station (22), by means of the "cookie" utility the specified private data (i.e. the user ID and password where the latter was provided by the user).

In the case of electronic wallet, the setup phase should include "generation of electronic wallets", e.g. the user physically accesses a clearing office (e.g. a bank), pays a given amount of money and is provided with electronic wallet Id and password. The clearing office credits the specified electronic wallet by said amount. The latter procedure may be realized over communication network (i.e. without the user physically accessing the bank), in a known per se manner.

After having completed the setup phase, a normal course of operation according to one embodiment of the invention, will now be described.

Figure 6:
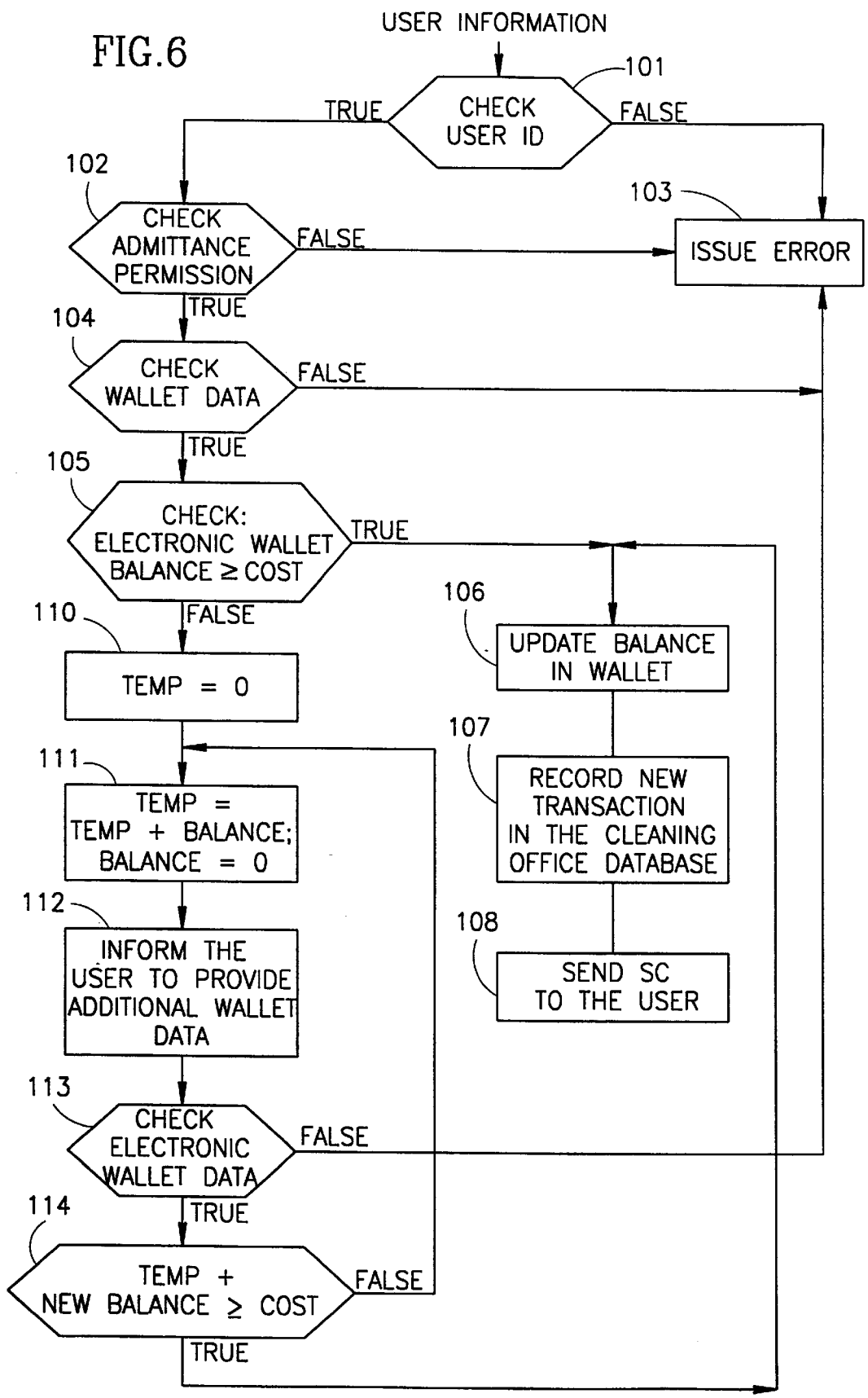
FIG. 6 is a simplified block diagram illustrating the operation of a cryptographic secured session between the first user and the clearing office in the architecture of FIG. 2, according to one embodiment of the invention.

Attention is now directed to FIG. 6, illustrating the various steps in the cryptographic secured session between the user station (22) and the clearing office station (26) according to one embodiment of the invention.

Thus, after having received the cost data from the vendor (via session (71) in FIG. 2), the user establishes a cryptographic secured session with the clearing office (72 in FIG. 2). In this connection it should be noted that establishing one session does not necessarily entail termination of the previous session. Accordingly, by one specific example, the user and the vendor establish communication session (71) and responsive to the receipt of the cost data (possibly through, normal, unsecured session), the user invokes establishment of user <-> clearing office cryptographic secured session without aborting the previous session. A straight forward approach for realizing the latter scenario is, e.g. the provision of an icon, the activation of which, results in establishing a user <-> clearing office session without the former leaving the session with the vendor.

Accordingly, the user establishes a session with the vendor and upon receipt of the cost data, the user clicks the specified icon, responsive to which another session (this time cryptographic secured session) is established between the user and the clearing office, without aborting the previous the user <-> vendor session. The "nesting" of communication sessions in the manner specified is well known in the art and therefore will not be further expounded upon herein. Those versed in the art will therefore appreciate that "establishment of communication session, in the context of the invention, is not bound to any specific technical realization and it encompasses also the specified nested communication.

Reverting now to FIG. 6, the clearing office checks the validity of this data by activating the "cookie" utility and accessing the private data that is stored at the user station. If no data is stored, or the stored private data does not match that stored in the clearing office database (steps 101 and 102), no admittance is approved and communication session terminated (step 103). Of course, the number of retries may be permitted before communication is terminated.

In communication (72) of the specified cryptographic secured session, user privileged information that includes the electronic wallet identification code (e.g. 10 characters long), and password (e.g. 16 characters long), as well as transaction specific information (i.e. said cost data) are also transferred to the clearing office (26). The electronic wallet identification code and password are compared against the corresponding data a priori stored therein (104) (the latter as recalled were produced and stored in the database of the clearing office, in a known per se manner). In the case of match, the balance of the wallet is compared to the cost data (105) (i.e. balance≧cost). In case of affirmative result, the balance is duly updated (106) (i.e. new balance=previous balance−cost), and the particulars of the current transaction are recorded in the database of the clearing office. These particulars may include e.g: transaction validity code (i.e. the safety code SC) that is generated e.g. by known per se pseudo random function; the first user identification code; the second user code (which, optionally, was also transferred in the session (72)), other data may be added or deleted, all as required and appropriate. Now the clearing office sends via communication (73) of the specified cryptographic secured session the SC to the user.

The procedure described in blocks (110) to (114) is a non-limiting example for handling a situation where the balance in the current electronic wallet<cost, responsive to which the user is offered to provide additional electronic wallet, or wallets, (each associated, of course, with different user privileged information) in order to have a cumulative balance that exceeds the specified cost.

Having completed, successfully, the cryptographic secured session between the user and the clearing office, the user now transfers the SC to the vendor in a communication session (74) (see FIG. 2).

Figure 7:
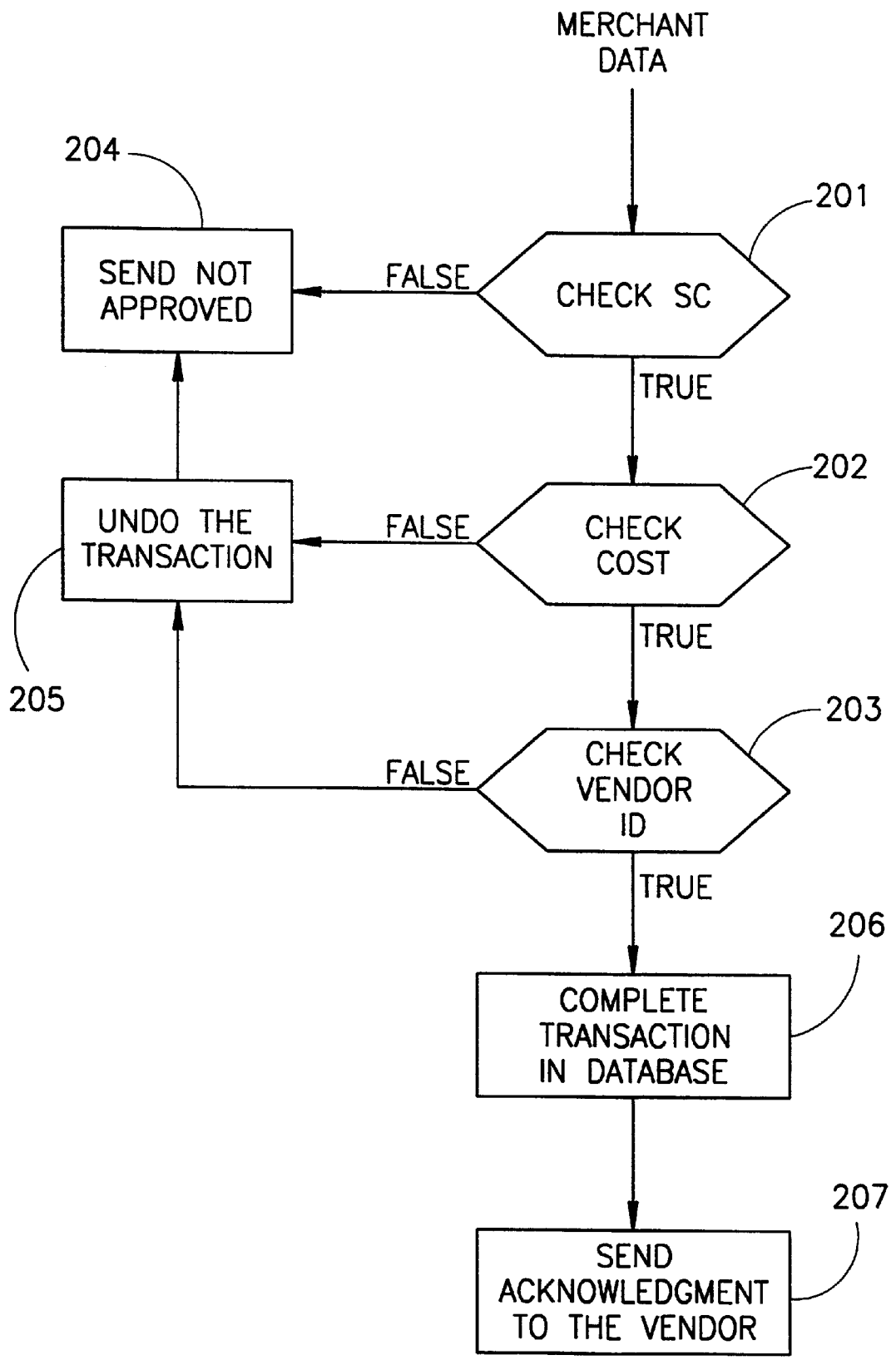
FIG. 7 is a simplified block diagram illustrating the operation of a cryptographic secured session between the second user (vendor) and the clearing office in the architecture of FIG. 2, according to one embodiment of the invention.

Attention is now directed to FIG. 7 illustrating a simplified block diagram of the operation of a cryptographic secured session between the vendor and the clearing office in the architecture of FIG. 2, according to one embodiment of the invention. The latter is required in order to complete the commercial transaction between the user and the vendor, by this particular embodiment.

Thus, after receiving the SC from the user, the vendor (24) and the clearing office establish cryptographic secured session (75), and the vendor transfers to the clearing office the SC along with the vendor identification code, as well as the cost.

The clearing office checks the existence of the SC in the clearing office database (201), and in case of match, the cost data and the vendor ID are checked against the clearing office database (steps 202 and 203, respectively). If any of the specified tests (201–203) fails, a "transaction not approved" signal is sent to the vendor, indicating that the business transaction between the user and the vendor will not take place.

In the case of failure in steps (202) and (203) before the transmittal of "not approved" (step 204), the proper record representative of the current transaction in the clearing office database is undone (205), i.e. the balance of the user is restored to the original balance (new balance=current balance+cost).

If, on the other hand, the tests (201–203) are all successfully met, the proper record representative of the current transaction is duly updated to indicate that the transaction has successfully completed (206), and acknowledgement is transmitted from the clearing office (26) to the vendor (24) via communication (76) of the cryptographic secured session.

All that remains to be done is to deliver the specified product or service from the vendor to the user (not shown in the drawings).

Whilst the invention has been described with reference to a specific embodiment of a payment system, the invention is by no means limited to this specific payment system and variants thereof are of course also applicable. Moreover, other applications are also feasible, e.g. a casino system.

The operation of a casino payment will now be described. It should be commented that the electronic casino systems as such are known in the art and therefore are not described in further detail herein.

Consider a gambler in an electronic casino system that won the amount of US$ 100.- and the casino intends to pay to the gambler, however, without disclosing to the gambler the casino privileged information.

The casino, by this example, stands for first user and the gambler stands for the second user. In the process described, e.g. with respect to FIG. 6, the casino obtains an SC from the clearing office, where the SC attests that the casino commits to pay the specified amount (e.g. US$ 100.-).

The SC is now transmitted to the gambler (second user) and the latter commences a sequence of operations, of the kind depicted in FIG. 7, in order to obtain acknowledgement from the clearing office. In case of successful termination of the specified sequence of operations, as depicted in FIG. 7, the acknowledgement signal is sent indicating that the gambler's account has been credited by US$ 100.-.

If desired, the acknowledgement signal itself, represents monetary transfer e.g. "electronic money", such as Internet money, that can be used by the gambler for acquiring other services from users that accept Internet money. As specified before, if desired, higher level of protection is applied also to the communication between the gambler and the casino.

Figure 8:
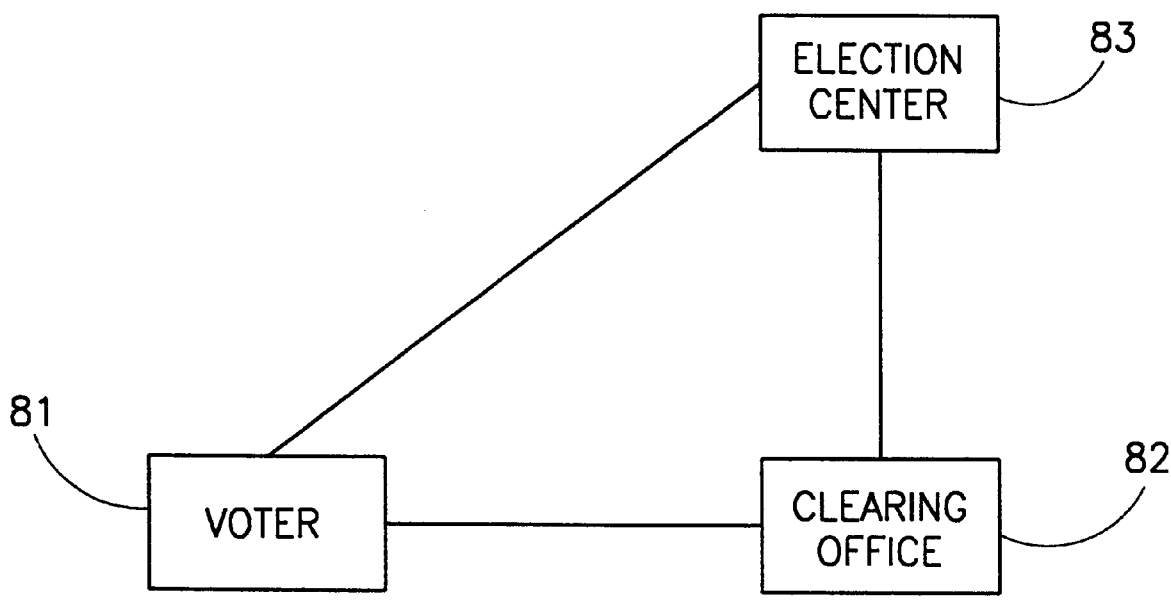
FIG. 8 is a simplified block diagram of an electronic election system, according to one embodiment of the invention.

Attention is now directed to FIG. 8 illustrating a simplified block diagram of an electronic election system for implementing e.g. a general election or election of a district candidate, according to one embodiment of the invention. In an electronic election system, realized e.g. over the Internet, at least the following requirements should be met: (i) an authorized voter is entitled to vote only once; (ii) election center should not be able to correlate between a voter and his vote, thereby complying with the right of privacy stipulated by law.

The procedure, as depicted generally in FIG. 8, resembles to a large extent the sequence of operation that has been described in detail, with reference to FIG. 2, and therefore will only briefly be described herein. It should be noted that by this specific embodiment, the transaction is of non-commercial nature, i.e. voting.

Thus, the voter is a priori provided with e.g. a smart card with his privileged information such as identity number and other pertinent information, if required in order to duly assure that this particular user is entitled to vote. In a normal course of election, the voter (81) establishes a cryptographic secured session with the clearing office (82), and transmits via said session, the user privileged information. The clearing office (82) after having received user privileged information will conduct a transaction validity check against a database (not shown in FIG. 8) in order to ascertain the right of the voter under question to vote. Having affirmed that the voter is entitled to vote, the clearing office sends a transaction validity code which as specified before does not include the user privileged information.

Note that by this particular embodiment, transaction specific information is not necessarily required.

After having received the SC (81), a cryptographic secured session is established between the voter (81) and the election center (83).

The specified SC along with the desired vote are now transmitted via said session to the election center (83). Next, the election center (83) and the clearing office (82) establish a cryptographic secured session via which the SC is transmitted to the clearing office which checks its validity (i.e. whether it exists in the clearing office database) and in case of affirmative conclusion, an acknowledgement is sent back to the election center, thereby rendering the vote of the specified voter valid without the election center having access to the voter privileged information.

In the claims which follow, alphabetic characters are used to designate claim steps are provided for convenience of description only, and do not necessarily imply any particular order of performing the steps.

What is claimed is:

1. A method for conducting transaction between first user and a remote second user interlinked through a communication network by utilizing also a clearing office interlinked to said network: the clearing office storing at least user privileged information; the method comprising:

(a) the user and the clearing office establishing a cryptographic secured session, the user transmitting, via said session, at least user privileged information and transaction specific data;

(b) the clearing office activating transaction validity checking procedure by utilizing at least said user privileged information or portion thereof and said transaction specific data or portion thereof;

(c) in response to affirmative result of said transaction validity checking, the clearing office producing at least a transaction validity indication that is not being indicative of said first user privileged information; the clearing office and said first user establishing a communication session and the clearing office transmitting, via said session, at least said transaction validity indication;

(d) the first user receiving, via said session, the transaction validity indication; the first user and the second user establishing a communication session and the first user transmitting, via said session, at least said transaction validity indication;

(e) the second user and the clearing office establishing cryptographic secured session and the second user transmitting, via said session, at least said transaction validity indication;

(f) the clearing office applying a second checking procedure, and in case of affirmative result sending at least an acknowledgement to the second user, whereby the first user privileged information is not accessible to the second user.

2. The method according to claim 1, wherein step (a) is preceded by the step of the first user establishing a communication session with said second user for acquiring, via said session said transaction specific data.

3. The method according to claim 1, wherein said transaction being a commercial transaction.

4. The method according to claim 1, wherein said transaction conducted between said first user and said second user being that the first user purchasing at least one product from the second user.

5. The method according to claim 1, wherein said first user is associated with at least one electronic wallet and said user privileged information being indicative of at least respective electronic wallet identification code for each wallet; said transaction specific data includes the cost of said at least one product.

6. The method according to claim 1, wherein said first user is associated with at least one credit card and said user privileged information being indicative of at least respective credit card number for each credit card; said transaction specific data being indicative of the cost of said at least one product.

7. The method according to claim 1, wherein said transaction being a non-commercial transaction.

8. The method according to claim 7, wherein first user stands for a voter and said second user stands for election center, and wherein said transaction being that the voter votes for a given party or candidate; said user privileged information being indicative of the voter identification number.

9. The method according to claim 1, wherein said communication network includes the Internet.

10. The method according to claim 9, wherein said cryptographic secured session is established by utilizing an SSL protocol.

11. The method according to claim 9, further comprising a preliminary step of:

storing user private data accessible to the clearing office, which user private data is utilized by the clearing office for admittance control of the first user.

12. The method according to claim 11, wherein said storing is effected by means of a cookie utility.

13. A system for conducting a transaction over a communication network, comprising:

a clearing office system, first user system and a second user system all interlinked by means of said communication network;

the user system and the clearing office system being operative to establish a cryptographic secured session, the user transmitting, via said session, at least user privileged information, and transaction specific data;

the clearing office system being operative to activate transaction validity checking procedure by utilizing at least said user privileged information or portion thereof, and said transaction specific data or portion thereof;

in response to affirmative result of said transaction validity checking, the clearing office system being operative to produce at least a transaction validity indication that is not being indicative of said first user privileged information;

the clearing office system and said first user system being operative to establish a communication session and the clearing office system being operative to transmit, via said session, at least said transaction validity indication;

the first user system being operative to receive, via said session, the transaction validity indication;

the first user system and the second user system being operative to establish a communication session and the first user system being operative to transmit, via said session, at least said transaction validity indication;

the second user system and the clearing office system being operative to establish cryptographic secured session and the second user system being operative to transmit, via said session, at least said transaction validity indication;

the clearing office being operative to apply a second checking procedure, and in the case of affirmative result, sending at least an acknowledgement to the second user system, whereby the first user privileged information is not accessible to the second user system.

14. The system according to claim 13, wherein said transaction being a commercial transaction.

15. The system according to claim 13, wherein said transaction conducted between said first user system and said second user system being that the first user system purchasing at least one product from the second user system.

16. A system for conducting transaction over communication network, comprising:

a clearing office system, first user system and a second user system all interlinked by means of said communication network;

said first user system and said clearing office system being capable of establishing cryptographic secured session, the user transmitting, via said session, at least user privileged information and transaction specific data, the transaction specific data being indicative of at least transaction identification data;

said clearing office system being capable of activating transaction validity checking Procedure by utilizing at least (i) said user privileged information or portion thereof; and (ii) said transaction specific data or portion thereof;

in response to affirmative result of said transaction validity checking, the clearing office system being capable of producing at least a transaction validity indication which is indicative of at least said transaction identification code and not of said first user privileged information;

the clearing office and said second user being capable of establishing a communication session and the clearing office transmitting, via said session, at least said transaction validity indication, whereby the first user privileged information is not accessible to the second user system, wherein said first user system is associated with at least one electronic wallet and said user privileged information is indicative of at least respective electronic wallet identification code for each wallet; and said transaction specific data includes the cost of at least one product.

17. A system for conducting transaction over communication network, comprising:

a clearing office system, first user system and a second user system all interlinked by means of said communication network;

said first user system and said clearing office system being capable of establishing cryptographic secured session, the user transmitting, via said session, at least user privileged information and transaction specific data, the transaction specific data being indicative of at least transaction identification data;

said clearing office system being capable of activating transaction validity checking procedure by utilizing at least (i) said user privileged information or portion thereof; and (ii) said transaction specific data or portion thereof;

in response to affirmative result of said transaction validity checking, the clearing office system being capable of producing at least a transaction validity indication which is indicative of at least said transaction identification code and not of said first user privileged information;

the clearing office and said second user being capable of establishing a communication session and the clearing office transmitting, via said session, at least said transaction validity indication, whereby the first user privileged information is not accessible to the second user system, wherein said first user system is associated with at least one credit card and said user privileged information is indicative of at least respective credit card number for each credit card; said transaction specific data being indicative of the cost of at least one product.

18. The system according to claim 13, wherein said transaction being a non-commercial transaction.

19. The system according to claim 18, wherein first user system stands for a voter and said second user system stands for election center, and wherein said transaction being that the voter votes for a given party or candidate; said user privileged information being indicative of the voter identification number.

20. The system according to claim 13, wherein said communication network includes the Internet.

21. The system according to claim 20, wherein said cryptographic secured session is established by utilizing an SSL protocol.

22. The system according to claim 13, wherein said user privileged information is stored in removable smart card.

* * * * *